(12) United States Patent
Puchinger et al.

(10) Patent No.: US 8,114,953 B2
(45) Date of Patent: Feb. 14, 2012

(54) MELAMINE-FORMALDEHYDE CONDENSATES WITH THERMOPLASTIC PROPERTIES

(75) Inventors: Helmut Puchinger, Freistadt (AT); Andreas Endesfelder, Linz (AT); Martin Burger, Linz (AT); Clemens Schwarzinger, Wels (AT); Manuela Leidl, Braunau (AT); Werner Huber, Kirchberg (AT); Harald Schmidt, Linz (AT)

(73) Assignee: AMI Agrolinz Melamine International GmbH, Linz (AT)

( * ) Notice: Subject to any disclaimer, the term of this patent is extended or adjusted under 35 U.S.C. 154(b) by 648 days.

(21) Appl. No.: 12/280,246

(22) PCT Filed: Feb. 22, 2007

(86) PCT No.: PCT/EP2007/001692
§ 371 (c)(1),
(2), (4) Date: Sep. 29, 2008

(87) PCT Pub. No.: WO2007/096200
PCT Pub. Date: Aug. 30, 2007

(65) Prior Publication Data
US 2009/0054616 A1    Feb. 26, 2009

(30) Foreign Application Priority Data

Feb. 23, 2006 (EP) .................................. 06075451
Jun. 9, 2006 (DE) .......................... 10 2006 027 760

(51) Int. Cl.
*C08G 12/32* (2006.01)
*C08G 12/00* (2006.01)

(52) U.S. Cl. ........................................ 528/254; 528/230
(58) Field of Classification Search .................. 528/254, 528/230
See application file for complete search history.

(56) References Cited

U.S. PATENT DOCUMENTS

| 2,980,637 | A | | 4/1961 | Culbertson et al. |
| 3,056,755 | A | | 10/1962 | Culbertson et al. |
| 3,202,635 | A | * | 8/1965 | Galinke ............... 528/254 |
| 5,916,999 | A | | 6/1999 | Berbner et al. |
| 7,173,104 | B2 | | 2/2007 | Ratzsch et al. |
| 2005/0014869 | A1 | | 1/2005 | Brogan et al. |
| 2005/0282994 | A1 | | 12/2005 | Brogan et al. |

(Continued)

FOREIGN PATENT DOCUMENTS
DE        905850        3/1954

(Continued)

OTHER PUBLICATIONS

Wicks Zeno W. Jr. et al. "Model Compound for Melamine Formaldehyde Resins", J. Coat Technol, Jul. 1983, pp. 29-34, vol. 55, No. 702, XP009083542.

*Primary Examiner* — Duc Truong
(74) *Attorney, Agent, or Firm* — The Webb Law Firm (57) ABSTRACT

The invention relates to melamine-formaldehyde condensates with thermoplastic properties that can be produced from formaldehyde and melamine derivatives, wherein at least one of the melamine derivatives organic radicals R have been used to substitute at least four of the total of six hydrogen atoms of the three melamine amino groups, and wherein the organic radicals R are mutually identical or different. The invention also relates to a process for production of the melamine-formaldehyde condensates, use thereof, and an analytical method for determining the constitution of the melamine-formaldehyde condensates.

20 Claims, 6 Drawing Sheets

U.S. PATENT DOCUMENTS

| | | |
|---|---|---|
| 2006/0100317 A1 | 5/2006 | Ratzsch et al. |
| 2006/0276581 A1 | 12/2006 | Ratzsch et al. |

FOREIGN PATENT DOCUMENTS

| | | |
|---|---|---|
| DE | 1103582 | 10/1959 |
| EP | 1416005 A1 | 6/2004 |
| WO | 9634133 A1 | 10/1996 |
| WO | 03046053 A1 | 5/2003 |
| WO | 03106558 A1 | 12/2003 |
| WO | 2005010097 A1 | 2/2005 |
| WO | 2005010113 A1 | 2/2005 |

* cited by examiner

MELAMINE-FORMALDEHYDE CONDENSATES WITH THERMOPLASTIC PROPERTIES

BACKGROUND OF THE INVENTION

1) Field of the Invention

The invention relates to novel melamine-formaldehyde condensates having thermoplastic properties, a process for the preparation thereof, the use thereof and a method for the analysis thereof.

2) Description of the Related Art

Melamine-formaldehyde resins are used mainly in the wood industry as binders in plywood boards, in laminates, as crosslinking agents in finishes and as bonding material for compression molding compounds. These conventional resins are highly crosslinked and therefore rigid and hard thermosetting plastic materials. The crosslinking takes place as a rule even at low temperatures, so that the materials cannot be melted without crosslinking and thermoplastic processability is therefore not possible.

In the past, various approaches were chosen for improving the thermoplastic processability of aminoplasts, such as melamine-formaldehyde resins.

One approach consists in the transetherification of already etherified melamine resins (WO 03/106558). There, first melamine-aldehyde precondensates are etherified with low molecular weight alcohols and then transetherified with higher molecular weight alcohols. The crosslinked resins prepared in this manner have good melting behavior, i.e. there is a sufficiently large processing window between their melting point and the temperature at which curing begins.

A disadvantage in the case of the known etherified melamine resins is that they are strongly crosslinked and therefore have a relatively high viscosity even in the melt. On incorporation of fillers, the viscosity increases further so that a homogeneous distribution of the fillers in the resin is scarcely possible. Furthermore, the high viscosity results in poor flow behavior of the resin melt in the processing mold.

Another approach for increasing the flexibility of melamine resin molding materials is described in WO 2005/010097. Here, a crosslinked melamine resin ether is mixed with a crosslinked thermoplastic. Crosslinked thermoplastics, such as an ethylene-vinyl acetate copolymer or an ethylene-acrylate copolymer, act as lubricants and thus improve the flow behavior of the molding materials. A disadvantage is that the mechanical properties of the molding materials deteriorate as a result of the addition of thermoplastics.

A further approach for changing the properties of melamine resins consists, for example, in carrying out the condensation reaction with already modified melamine derivatives. Thus, the use of N-alkylated melamine derivatives for the preparation of the polymer products and the condensates thereof with formaldehyde is already known.

The US applications 2005/0282994 and 2005/0014869 describe N-alkylmelamine-formaldehyde compositions which are used as crosslinking agents in finish systems. In particular di- and trialkylmelamines or mixtures thereof are described and the crosslinking thereof with carbamates or compounds which contain active hydrogen.

U.S. Pat. Nos. 3,056,755 and 2,980,637 describe the use of di- and trialkylmelamines and the condensates thereof with formaldehyde and in some cases also alcohols as a constituent of baking enamels. Here, however, the resins described are always only one constituent, which is generally used for crosslinking of alkyd resins. The uses of these condensates are limited to finish systems in which the melamine products are used as crosslinking agents. The condensates are suitable for the formation of crosslinked polymers which as a rule are not processable or only very poorly processable in the melt. Furthermore, in none of these cases are thermoplastic properties of the melamine-formaldehyde condensates reported.

SUMMARY OF THE INVENTION

The invention is based on the problem of providing novel melamine-formaldehyde condensates which have good thermoplastic processability, good postforming properties and good mechanical properties.

This object is achieved by the provision of a melamine-formaldehyde condensate disclosed herein.

BRIEF DESCRIPTION OF THE DRAWINGS

The invention is explained in detail below with reference to FIGS. 1 to 3 and several working examples.

DETAILED DESCRIPTION OF THE PREFERRED EMBODIMENTS

The melamine-formaldehyde condensate according to the invention which has thermoplastic properties is prepared from formaldehyde and melamine derivatives, at least four of the total of six hydrogen atoms of the three amino groups of the melamine being substituted by organic moiety R in at least one of the melamine derivatives, the organic moieties R being identical to or different from one another.

The amino groups of the melamine are therefore present in N-substituted form. The melamine derivatives used according to the invention thus have, on the amino groups of the melamine, only two free hydrogen atoms which are accessible to a further chemical reaction.

The free hydrogen atoms are preferably present on two secondary amino groups. This is due to the different chemical reactivity of primary and secondary amines, substitution always preferably taking place first at primary and only thereafter at secondary amino groups. Thus, the melamine derivatives used according to the invention preferably have two secondary amino groups and one tertiary amino group.

On reaction of the melamine derivatives used according to the invention with formaldehyde, only the formation of two methylol groups per melamine ring, preferably at two different secondary amino groups, therefore occurs. This is due to a preferred formation of linear oligomers and polymers during the further condensation.

At appropriate temperatures, the linear chain molecules can slide on one another, with the result that the resin can be melted and can be thermoplastically processed even at relatively low temperatures. The condensates according to the invention therefore have very good flow behavior and can be distributed in shaping molds in an excellent manner.

Purely linear melamine-formaldehyde condensates are obtained if four of the six amino hydrogen atoms are substituted in the case of 100% of the melamine derivatives used. On reaction of these melamine derivatives with formaldehyde, the resulting polymers are forced to adopt a linear architecture.

Advantageously, the melamine-formaldehyde condensates contain from 10 to 99% of melamine derivatives in because at least four of the total of six hydrogen atoms of the three amino groups of the melamine are substituted by organic moieties R.

In addition to the at least tetrasubstituted melamine derivatives, it is therefore also possible for further components to be present in the melamine-formaldehyde condensates. Thus, unsubstituted melamine or mono- to hexasubstituted melamine derivatives or mixtures thereof are advantageously used. The degree of substitution of the melamine derivatives used in the mixtures is therefore variable.

In the case of the various degrees of substitutions, both identical organic moieties R and different moieties R can be used.

Thus, it is possible to prepare melamine-formaldehyde condensates which have different proportions of linear structures. If four of the six amino hydrogen atoms are already substituted in the case of from 10 to 99% of the melamine derivatives used, from zero to six of the of the total of six amino hydrogen atoms may be substituted by an organic moiety in the case of the remaining 90 to 1% of the melamine derivatives used or any desired mixtures of these melamine derivatives may be used.

Advantageously, the melamine-formaldehyde condensates also contain from 90 to 1% of acetoguanamine, benzo-guanamine, substituted or transaminated acetoguanamines or benzoguanamines, phenols or any desired mixtures thereof in addition to the at least tetra-N-substituted melamine derivatives.

Advantageously, a $C_1$-$C_{20}$-alkyl, a $C_5$-$C_{30}$-cycloalkyl, a $C_6$-$C_{24}$-aryl, a $C_7$-$C_{30}$-arylalkyl, a hydroxy-$C_2$-$C_{10}$-alkyl, a hydroxy-$C_2$-$C_4$-alkyl(oxa-$C_2$-$C_4$-alkyl), where n is from 1 to 5, and/or an amino-$C_2$-$C_{12}$-alkyl moiety are used as organic moieties R suitable for the derivatization or N-substitution.

Ethyl, propyl, isopropyl or benzyl moieties are preferred, particularly preferably methyl moieties. An advantage of using methyl groups is their easy accessibility via many methylation reagents. A further advantage is also that methyl groups are small and the structure of the melamine is therefore only slightly influenced and hence the melamine properties are as far as possible retained.

The melamine-formaldehyde condensates advantageously have a partially linear structure, preferably however a completely linear structure.

Overall, novel materials which have interesting novel properties are produced by the targeted derivatization or N-substitution of the amino groups of the melamine before the preparation of melamine-formaldehyde condensates. By varying the degree of N-substitution or using a mixture of melamine derivatives having different degrees of substitution and by mixing with underivatized melamine, these properties can be varied within a broad spectrum.

As a result of the derivatization or N-substitution of the amino groups, improved solubility of the triazine derivatives is achieved. This permits resin preparation under mild conditions; thus, in some cases a reaction with formaldehyde takes place even at room temperature. Furthermore, substantially more uniform resins are obtained since the total melamine derivative is present in dissolved form as early as the beginning of the reaction and is not brought into solution by reaction itself. Thus, it is possible to establish whether preferably monomer, dimers, trimers or oligomer are formed by the choice of the reaction conditions and of the reaction times. It is also clear that narrow molar mass distributions are achievable. The width of the molar mass distribution can, however, also be broadly varied by the composition comprising different melamine derivatives.

Another advantage is the, owing to the improved solubility of the derivatized melamines, it is also possible to reduce the amount of formaldehyde in the resin preparation to a ratio of melamine derivatives to formaldehyde of 1:1. Nevertheless, by increasing the temperature or adding curing catalysts, crosslinking of the resins can be achieved. However, it is thus possible to produce components having reduced emissions, with regard to both the formaldehyde emissions and the VOC emissions.

Advantageously, the melamine-formaldehyde condensates according to the invention have a melting range from 70 to 130° C. and a melt viscosity of from 0.1 to 100 Pa·s.

The condensates are also characterized in that no crosslinking between the generally linear condensates occurs in a temperature range from 70 to 130° C. Crosslinking of the generally linear condensates occurs only at temperatures above 130° C. or after addition of a curing catalyst.

Advantageously, the methylol groups of the melamine-formaldehyde condensates are present in partially or completely etherified form, preferred alcohols for the etherification being methanol, ethanol, propanol, isopropanol, butanol, cyclohexanol, phenol, benzyl alcohol, monoalkyl ethers of ethylene glycol or propylene glycol or mixtures thereof.

The object of the present invention is also achieved by a process for the preparation of the melamine-formaldehyde condensates.

According to the invention, the melamine-formaldehyde condensates are prepared by a process in which the reaction of
a) melamine derivatives, at least four of the total of six hydrogen atoms of the three amino groups of the melamine being substituted by organic moieties R in the melamine derivatives, and/or
b) mixtures of melamine derivatives according to a) and melamine derivatives in which no hydrogen atoms and/or one to six of the total of six hydrogen atoms of the three amino groups is substituted by organic moieties, and/or
c) mixtures of melamine derivatives according to a) and acetoguanamine, benzoguanamine, substituted or transaminated acetoguanamines, guanamines and/or phenols,
with formaldehyde is carried out in a solvent, preferably water, in a ratio of from 1:1 to 1:6, preferably from 1:1 to 1:3.

The reaction is advantageously effected in an alkaline medium but is also possible in a neutral or acidic medium.

The melamine derivatives used in the process according to the invention have, as organic moieties, a $C_1$-$C_{20}$-alkyl, a $C_5$-$C_{30}$-cycloalkyl, a $C_6$-$C_{24}$-aryl or a $C_7$-$C_{30}$-arylalkyl, a hydroxy-$C_2$-$C_{10}$-alkyl or a hydroxy-$C_2$-$C_4$-alkyl(oxa-$C_2$-$C_4$-alkyl), moiety, where n is from 1 to 5, and/or an amino-$C_2$-$C_{12}$-alkyl moiety, in particular a methyl, ethyl, propyl, isopropyl or benzyl moiety.

The melamine-formaldehyde condensates are advantageously etherified under acidic catalysis with alcohols, preferably methanol, ethanol, propanol, isopropanol, butanol, cyclohexanol, phenol, benzyl alcohol, monoalkyl ethers or ethylene glycol or propylene glycol or mixtures.

The melamine-formaldehyde condensates according to the invention are used as binders in laminates. The condensates permit postforming properties even without etherification of the methylol groups. Since the melamine-formaldehyde condensates according to the invention can be obtained both in solution and as dried powder, both wet impregnation and dry impregnation are possible.

Furthermore, the melamine-formaldehyde condensates according to the invention are used as binders in composite materials comprising natural fibers, glass fibers, wood products and further fillers and additives. The composite materials may contain, for example, wood, natural fibers, glass fibers, organic or inorganic fillers or synthetic fibers (e.g. polyamide, polyester).

The melamine-formaldehyde condensates according to the invention they are suitable for all customary processing methods, such as, for example, injection molding, compression molding, extrusion, etc.

The melamine-formaldehyde condensates according to the invention can also be used as a constituent of coating systems.

The object of the present invention is also achieved by a process for the analytical determination of the melamine-formaldehyde condensates according to the invention.

The structures are determined by a combination of various analytical methods. In addition, the change in the spectroscopic properties with the variation of the degree of polymerization is monitored. Knowledge of these data is essential for correct quantification of the individual species within a complex resin mixture.

Separation of the resin constituents is effected by means of high-pressure liquid chromatography (HPLC) and gel permeation chromatography (GPC). The HPLC or GPC fractions are collected and are analyzed by mass spectroscopy and the results are compared with the results of laser light scattering measurements and with external calibrations by means of polymer standards. The analytical methods comprise HPLC mass spectroscopy (MS), ESI-ion-trap-MS and MALDI-TOF-MS.

Furthermore, a sample is investigated by means of pyrolysis gas chromatography (GC)-(MS).

The characterization of the resin mixtures is also effected by HPLC in combination with a PDA detector and an ion trap mass spectrometer which can carry out MS" experiments.

By using these methods, an unambiguous assignment of the individual species of the mixture is possible. On crosslinking of the compounds, these become more and more insoluble in the solvents suitable for HPLC/MS measurements. The resins are therefore separated on GPC systems having IR, UV and scattered light detectors and the collected fractions are investigated by mass spectroscopy in order to determine the correct molar masses.

Completely cured systems are no longer soluble and are therefore no longer accessible to an investigation by liquid chromatography. The characterization is therefore effected with the aid of analytical pyrolysis and thermally induced hydrolysis and methylation (THM) on a GC/MS system. With the aid of this technique, not only the resin constituents but also fillers and additives can be determined.

Example 1

Preparation of 2,4-bismethyl-6-dimethyl-melamine as a Methylated Melamine Derivative The reaction is effected with stirring from cyanuric chloride (1 mol) with 2 mol of methylamine (40% strength) in acetone at a reaction temperature of from 0 to −5° C. After addition of NaOH (2 mol), heating is effected until a temperature of about 40-45° C. is reached. After a reaction time of about 2 hours, the product is filtered off. The product is stirred in water with an excess of dimethylamine with simultaneous addition of NaOH and refluxed for about 2 hours. Thereafter, cooling, filtration and drying are effected. The melting point Mp of the product obtained is 86-87° C.

Example 2

Preparation of a First Melamine-Formaldehyde Condensate

One mole of the methylated melamine according to Example 1 is reacted at 40° C. with 1 mol of formaldehyde (as a 37% strength formalin solution) at pH 8. During the entire reaction time, a suspension is obtained which, however, changes in a clearly detectable manner in its consistency. After 60 min, the reaction is complete and the product is filtered off and is dried in vacuo. A powder having a melting point of 120° C. and a molar mass of 300-400 is obtained. The product predominantly comprises dimers and trimers. The curing to give the resin is effected at elevated temperatures and with acidic catalysis.

Figure 1:
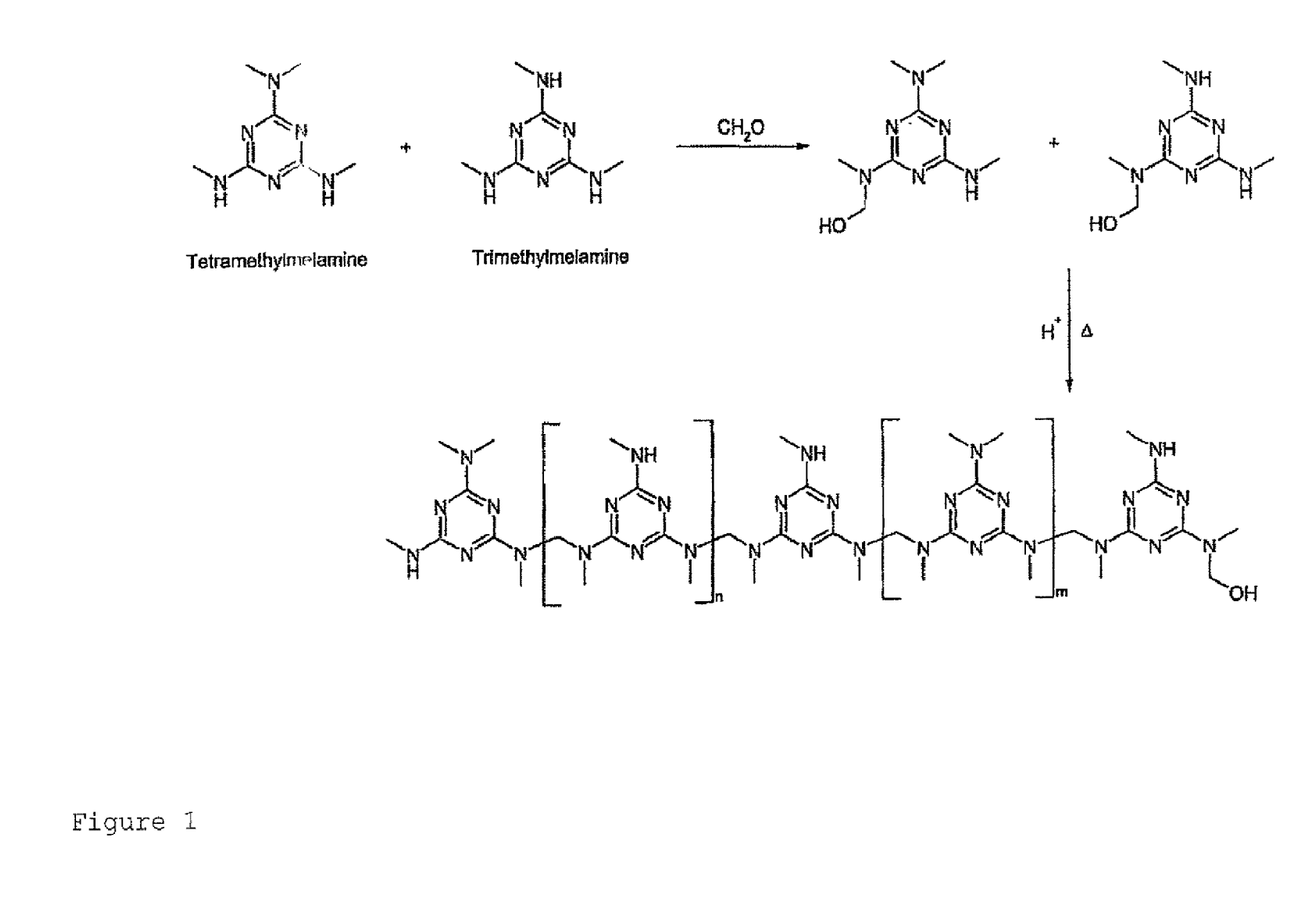
FIG. 1 shows the synthesis of a preferred embodiment of the melamine-formaldehyde condensates according to the invention.

The synthesis route, the structure of the condensate obtained and a structural section from the cured resin are shown in FIG. 1.

The polymerization taking place in the course of the curing process is visible by means of ESI-MS.

Figure 2A:
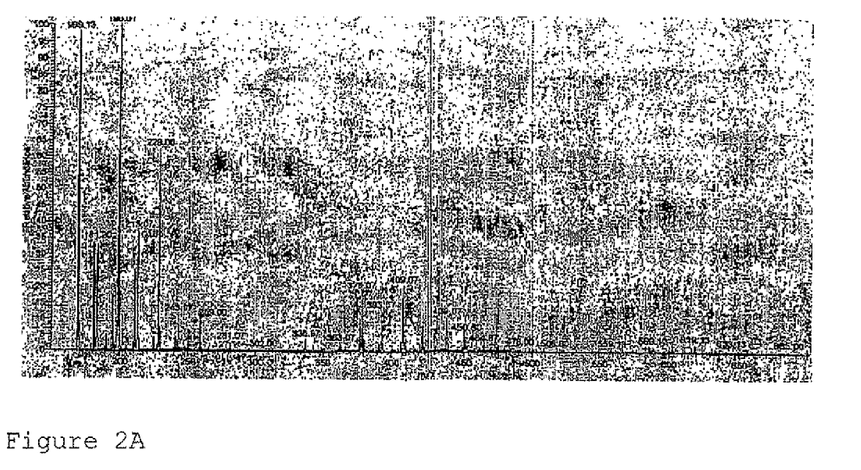
FIG. 2A shows an ESI-MS spectrum of a still uncured melamine-formaldehyde condensate.

FIG. 2A shows an ESI-MS spectrum of a still uncured melamine-formaldehyde condensate of tri- and tetra-methylmelamine. In the monomer region of 169-259 Da, methylolated melamine units having an average degree of substitution of 1 are detectable. The region of 349-469 Da comprises three different types of dimers: a hexamethyl species (349 Da), a heptamethyl species (363 Da) and an octamethyl species (377 Da). The most frequently occurring species is the hexamethyl dimer having one or two methylol groups (379 Da, 409 Da).

Figure 2B:
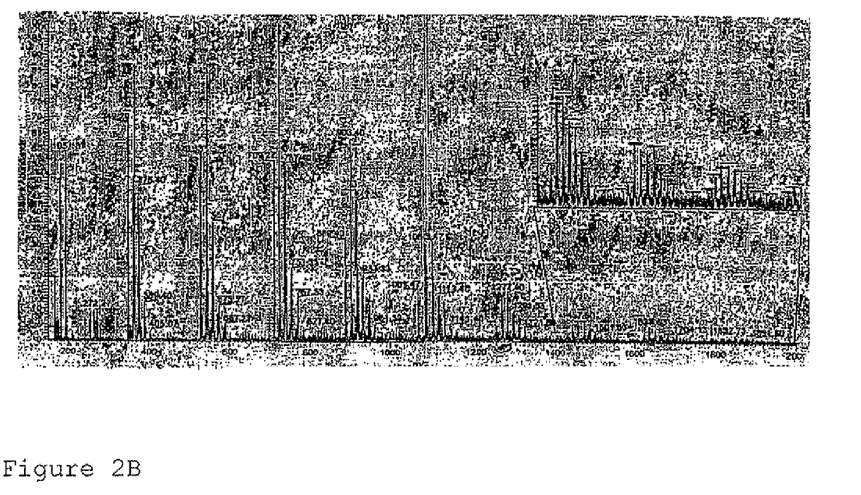
FIG. 2B shows an ESI-MS spectrum of a cured melamine-formaldehyde condensate.

FIG. 2B shows an ESI-MS of the same condensate after complete curing by formic acid at 140° C. The most frequently occurring peaks are at about 700 Da and can be assigned to tetramers. The highest mass is detectable at above 2000 Da.

Figure 3A:
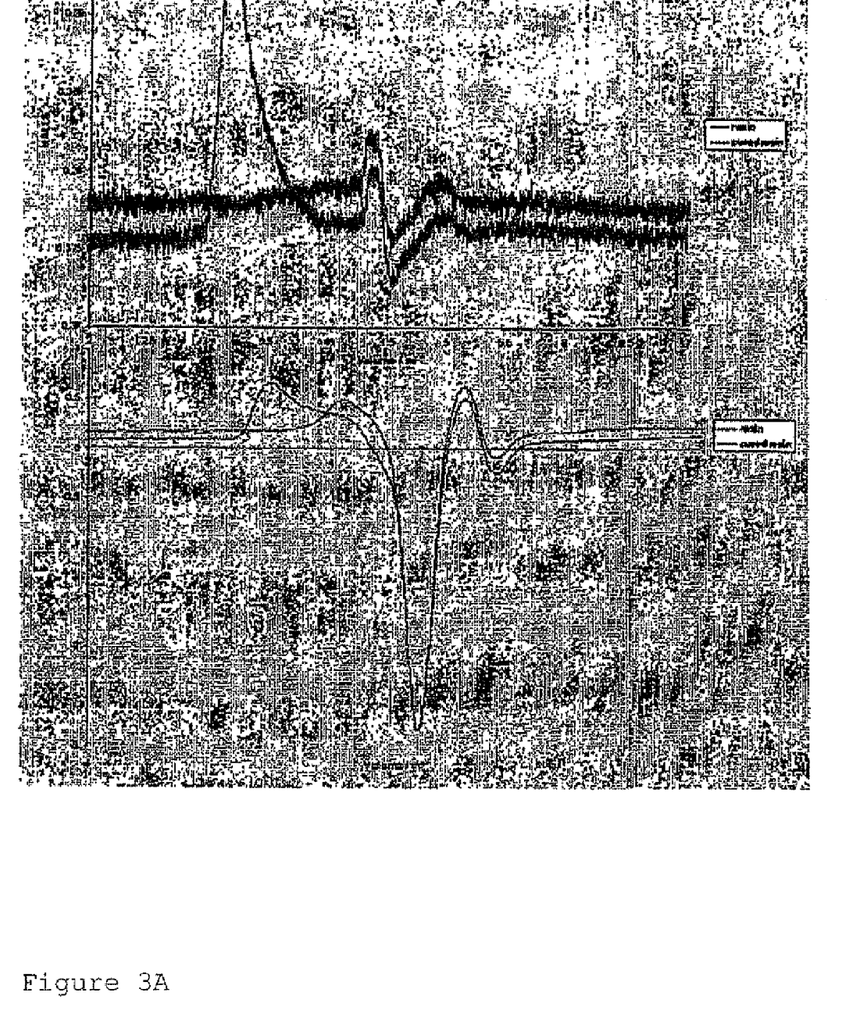
FIG. 3A shows a chromatogram of a separation of a sample of a melamine-formaldehyde product by means of GPC and subsequent MALLS and RI detection.
Figure 3B:
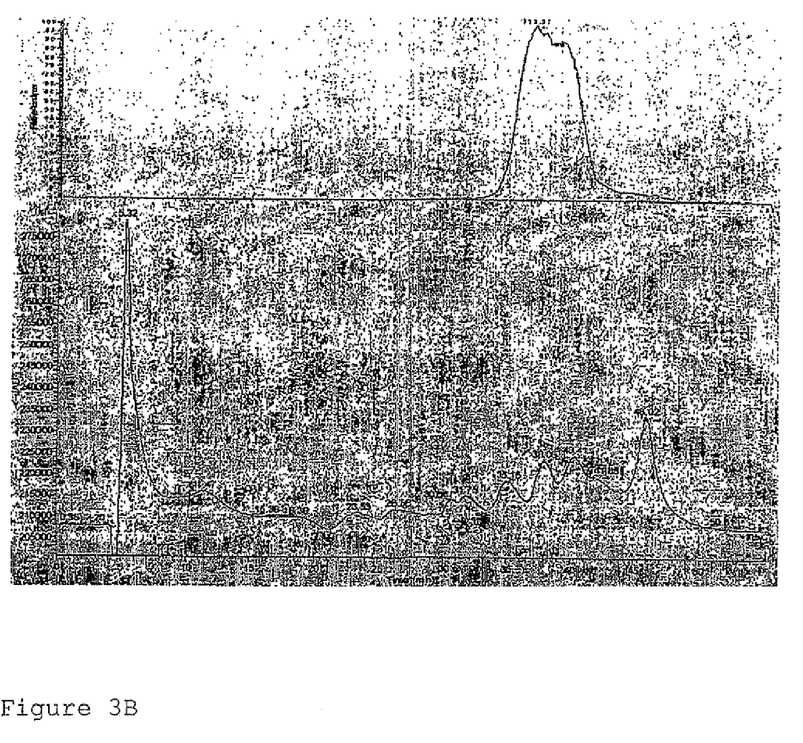
FIG. 3B shows a chromatogram of a separation of a sample of a melamine-formaldehyde product by means of HPLC and with subsequent MS and UV detection.

The separation of a sample of the resin was monitored by means of GPC with subsequent MALLS and RI detection (FIG. 3A) and by means of HPLC with subsequent MS and UV detection (FIG. 3B). With the use of HPLC-MS, a better separation of the oligomers in comparison with GPC is detectable. Because of the large number of different species, a clear separation into the individual isomers is not yet possible.

Figure 4:
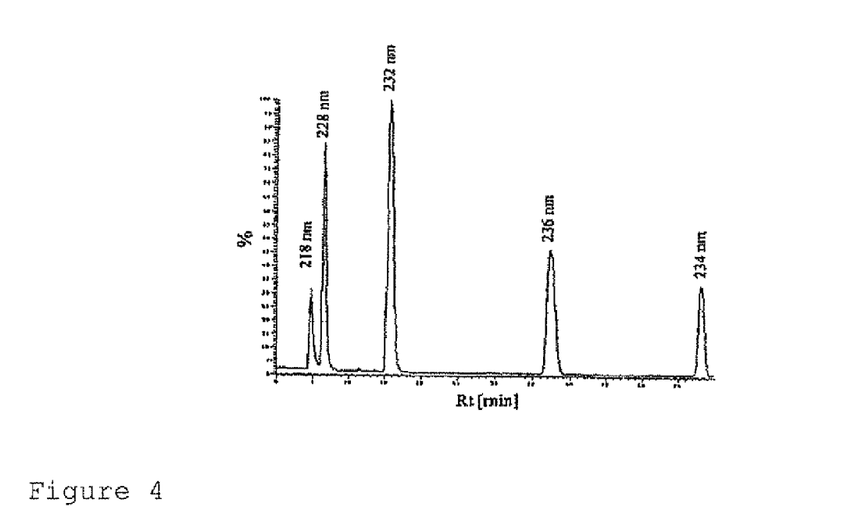
FIG. 4 shows a chromatogram of a separation of a sample of a melamine-formaldehyde product by means of high-pressure chromatography (HPLC)

FIG. 4 shows the dependence of the UV absorption maxima on the degree of polymerization. FIG. 4 shows the analytical characterization of the condensate by means of HPLC separation. A sample of the resin from Example 1 was separated into its constituents in the HPLC using a PDA detector and the molar masses thereof were determined by means of ion-trap-MS, ESI-MS and MALDI-TOF MS. The structure of the individual species can then be determined therefrom (cf. FIG. 1). The resin from Example 1 consists of about 55% of dimers (n=0), about 35% of trimers (n=1) and about 10% of higher homologs (n>1).

Figure 5:
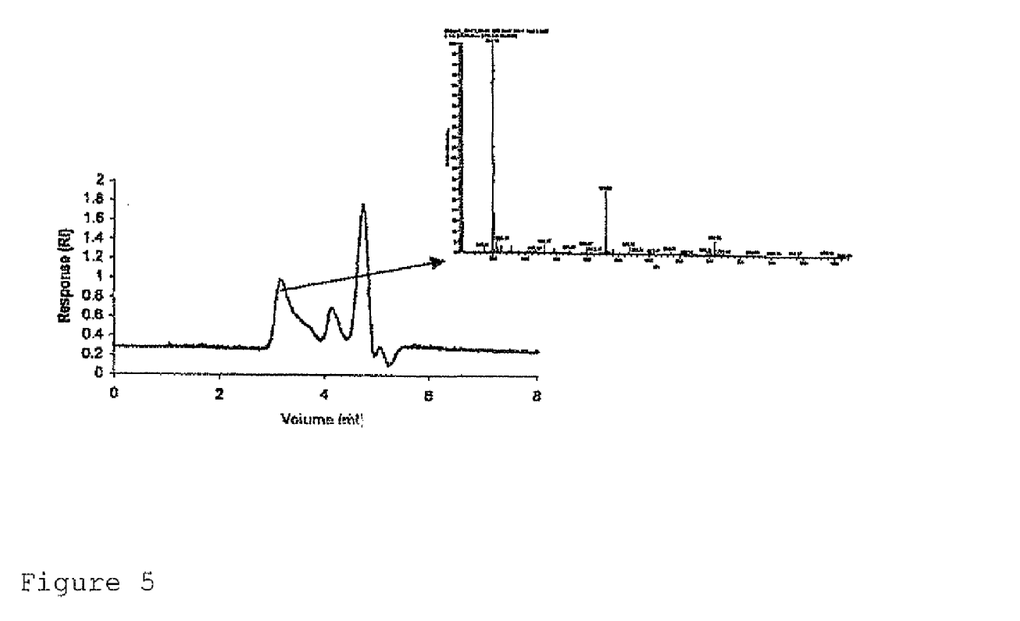
FIG. 5 shows a chromatogram of a separation of a sample of a melamine-formaldehyde product by means of gel permeation chromatography (GPC) and a mass spectrogram (MS) for determining the molecular mass of a selected fraction.

FIG. 5 shows the analytical characterization of the condensate by means of GPC/MS. A sample of the resin from Example 1 was separated on a GPC system using an RI, UV and light scattering detector, and the fractions were determined and their molar mass was determined by means of MS. Thus, it was also possible to determine the composition of the sample.

On complete curing, the resulting polymers are no longer soluble in organic solvents and can therefore not possible by means of customary HPLC, GPC or solvent-based MS techniques. In such cases, pyrolysis GC/MS has proven to be a valuable analytical method.

Figure 6:
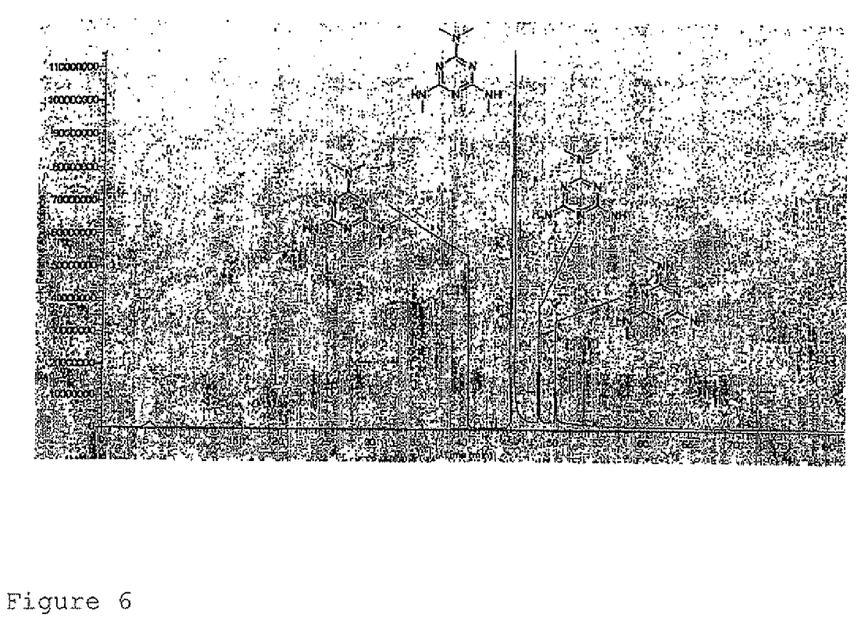
FIG. 6 shows a program of a pyrolysis GC/MS analysis.

FIG. 6 shows a pyrolysis GC/MS spectrogram of a cured tetramethylmelamine resin. The main products of the pyrolysis arise from breaking the bonds of the methylene bridges.

Example 3

Preparation of a Second Melamine-Formaldehyde Condensate 6 g of tetramethylmelamine and 24 g of trimethylmelamine are added to 90 ml of water and the mixture is heated to 70° C. Formalin solution (14.3 g) corresponding to a formaldehyde: triazine ratio of 1:1 is then added. The pH of the reaction mixture is 8.2. The mixture is kept at 70° C. for 30 min, cooled and evaporated down on a rotary evaporator. The resin is obtained as a white solid. The resin melts in a range of 80-100° C. and the molar masses are 300-400. The resin can be cured by heating to 140° C. (possibly with addition of acid), the molar mass increasing to substantially above 2000.

Example 4

Preparation of a Third Melamine-Formaldehyde Condensate 10 g of melamine and 2.5 g of tetramethylmelamine are added to 80 ml of water and heated to 80° C. Thereafter, 6 g of formaldehyde are added as formalin solution and kept at 70° C. for 15 min. Cooling and evaporation down on a rotary evaporator are then effected. The resin is obtained as a white solid. The resin melts at 120° C.-125° C. The molar mass is about 350.

Example 5

Preparation of a Fourth Melamine-Formaldehyde Condensate 15 g of a mixture of melamine and methylated melamines (18% of tetramethylmelamine, 30% of trimethylmelamine, 24% of dimethylmelamine, 15% of monomethylmelamine, 13% of melamine) are added to 100 ml of water and heated to 90° C. 10 g of formaldehyde as formalin solution are then added. The mixture is kept at 90° C. for 30 min, cooled and evaporated down on a rotary evaporator. The resin is obtained as a white solid. The resin melts in a range from 90-110° C. and the molar mass is 400-500.

Example 6

Production of a First Laminate Using a Melamine-Formaldehyde Condensate

On a Cavitec unit, decorative papers are sprinkled with 150-250% of the polymer from Example 2 and fixed in an IR field. Thereafter, the papers are pressed in a laminate press at 160-190° C. and pressures of 80-110 bar for 5 min. The test specimens have smooth, matt surfaces. The acid tests give results which are one stage poorer than pure MF resins.

In the deformation test according to EN 438 method A, bending radii of 3-4 mm are achieved with 0.7 mm laminates.

Example 7

Production of a Second Laminate Using a Melamine-Formaldehyde Condensate

On a Cavitec unit, decorative papers are sprinkled with 150-250% of a mixture of 90% of the polymer from Example 2 and 10% of Lamelite 139 (MF resin from AMI) and fixed in an IR field. Thereafter, the papers are pressed in a laminate press at 160-190° C. and pressures of 80-110 bar for 5 min. The test specimens have smooth, matt surfaces. The acid tests give results which are comparable with the pure Lamelite 139.

In the deformation test according to EN 438 method A, bending radii of 3-4 mm are likewise obtained with 0.7 mm laminates Example 8

Production of a Molding Using the Melamine-Formaldehyde Condensate

On a Cavitec unit, flax fiber nonwovens are sprinkled with 35% of the resin from Example 2. The polymer is then fixed in an IR field. These prepregs are then pressed at 190° C. and 120 bar for 3 min. After recooling to 70° C., the test specimens are removed.

The mechanical characteristics of the test specimens correspond substantially to those of test specimens which were produced using unsubstituted melamine resins.

Example 9

Production of Composite Materials Using the Melamine-Formaldehyde Condensate a) A mixture of 50 g of resin according to Example 2 and 50 g of wood is pressed with addition of 0.5 g of $NH_4Cl$ at 150° C. and a pressure of 80 bar to give boards. These boards have a modulus of elasticity of 2295 MPa in the bending test.
b) A mixture of 15 g of resin according to Example 2 and 50 g of wood is pressed with addition of 0.15 g of $NH_4Cl$ at 150° C. and a pressure of 80 bar. These boards have a modulus of elasticity of 3116 MPa in the bending test.
c) A mixture of 15 g of resin according to Example 3 and 50 g of cellulose is pressed with addition of 0.15 g of $NH_4Cl$ at 150° C. and a pressure of 80 bar. These boards have a modulus of elasticity of 4258 MPa in the bending test.

For comparison, a standard particle board from Egger (8 mm thickness, 95% wood) has a modulus of elasticity of 2282 MPa.

Example 10

Preparation of a Fifth Melamine-Formaldehyde Condensate 693.6 g of N,N'-dimethylmelamine, 91.8 g of water and 584.1 g of a 37% strength aqueous formaldehyde solution are heated together to 60° C. until a clear solution is obtained. Cooling to room temperature is then effected rapidly.

756.9 g of N,N',N"-trimethylmelamine, 135 g of water and 584.1 g of a 37% strength aqueous formaldehyde solution are stirred together at room temperature until the methylolmelamines formed are precipitated from the solution. Thereafter, this mixture is combined with the above mixture and a further 350 g of melamine derivative according to Example 1 and heated for 15 min to 60° C. A clear solution is obtained. After freeze-drying, the resin was obtained as a white solid.

Example 11

Production of Composite Materials Using the Melamine-Formaldehyde Condensate

On a Cavitec unit, flax fiber nonwovens are sprinkled with 35% of the resin from Example 10. The polymer is then fixed in an IR field. These prepregs are then pressed at 160° C. and 250 bar for 4 min. After recooling to 70° C., the test specimens are removed.

The mechanical characteristics of the composite material are shown in the following table.

| Tensile modulus MPa | Tensile strength MPa | Flexural modulus MPa | Flexural strength MPa | Impact strength kJ/m² |
|---|---|---|---|---|
| 9320 | 77.2 | 8311 | 131.7 | 20.5 |

The component emissions according to VDA 275 (formaldehyde) and VDA 277 (VOC—volatile organic content) are 29.6 and 18.5 ppm, respectively.

The component emissions of a comparable composite produced from Lamelite 139 (melamine-formaldehyde resin) are 45.0 and 77.0 ppm, respectively.

The invention claimed is:

1. A melamine-formaldehyde condensate having thermoplastic properties, prepared by the step of reacting formaldehyde with melamine derivatives, wherein four of the total of six hydrogen atoms of the three amino groups of the melamine are substituted by organic moieties R in at least one of the melamine derivatives before reacting with formaldehyde, so that free hydrogen atoms are present on two secondary amino groups, wherein the organic moieties R are identical to or different from one another and at least one organic moiety R is a $C_1$-$C_{20}$-alkyl, a $C_5$-$C_{30}$-cycloalkyl, a $C_6$-$C_{24}$-aryl, or a $C_7$-$C_{30}$-arylalkyl moiety.

2. The melamine-formaldehyde condensate as claimed in claim 1, wherein the condensate contains from 10 to 99% of melamine derivatives in which four of the total of six hydrogen atoms of the three amino groups of the melamine are substituted by organic moieties R.

3. The melamine-formaldehyde condensate as claimed in claim 1, wherein the condensate contains from 90 to 1% of melamine derivatives or mixtures thereof, and wherein four of the total of six hydrogen atoms of the three amino groups are substituted by organic moieties R in said melamine derivatives before reacting with formaldehyde.

4. The melamine-formaldehyde condensate as claimed in claim 1, wherein the condensate contains from 90 to 1% of acetoguanamine, benzoguanamine, substituted or transaminated acetoguanamines or benzoguanamines, phenols, or mixtures thereof.

5. The melamine-formaldehyde condensate as claimed in claim 1, wherein at least one organic moiety R is an ethyl, propyl, isopropyl, or benzyl moiety.

6. The melamine-formaldehyde condensate as claimed in claim 1, wherein at least one organic moiety is a methyl moiety.

7. The melamine-formaldehyde condensate as claimed in claim 1, wherein at least one organic moiety is a hydroxy-$C_2$-$C_{10}$-alkyl or a hydroxy-$C_2$-$C_4$-alkyl(oxa-$C_2$-$C_4$-alkyl)$_n$ moiety, where n is from 1 to 5, or an amino-$C_2$-$C_{12}$-alkyl moiety.

8. The melamine-formaldehyde condensate as claimed in claim 1, wherein the condensate has a generally linear structure.

9. The melamine-formaldehyde condensate as claimed in claim 1, wherein the condensate has a completely linear structure.

10. The melamine-formaldehyde condensate as claimed in claim 1, wherein the condensate has a melting range from about 70 to 130° C.

11. The melamine-formaldehyde condensate as claimed in claim 8, wherein no crosslinking between the generally linear condensates takes place in a temperature range from about 70 to 130° C.

12. The melamine-formaldehyde condensate as claimed in claim 1, wherein the condensate has a melt viscosity of from about 0.1 to 100 Pa·s.

13. The melamine-formaldehyde condensate as claimed in claim 8, wherein the crosslinking of the generally linear condensate takes place at temperatures above 130° C. or after the addition of a curing catalyst.

14. The melamine-formaldehyde condensate as claimed in claim 1, wherein methylol groups are present in partly or completely etherified form.

15. The melamine-formaldehyde condensate as claimed in claim 14, wherein the methylol groups are present in a form etherified by methanol, ethanol, propanol, isopropanol, butanol, cyclohexanol, phenol, benzyl alcohol, monoalkyl ethers of ethylene glycol or propylene glycol, or mixtures thereof.

16. A process for the preparation of melamine-formaldehyde condensates as claimed in claim 1, prepared by reacting a) melamine derivatives, wherein four of the total of six hydrogen atoms of the three amino groups of the melamine are substituted by organic moieties R in the melamine derivatives before reacting with formaldehyde, so that free hydrogen atoms are present only on two secondary amino groups, wherein the organic moieties R are identical to or different from one another and at least one organic moiety R is a $C_1$-$C_{20}$-alkyl, a $C_5$-$C_{30}$-cycloalkyl, a $C_6$-$C_{24}$-aryl or a $C_7$-$C_{30}$-arylalkyl moiety, and/or b) mixtures of melamine derivatives according to a) and melamine derivatives in which no hydrogen atoms or from one to six of the total of six hydrogen atoms of the three amino groups is substituted by organic moieties, and/or c) mixtures of melamine derivatives according to a) and acetoguanamine, benzoguanamine, substituted or transaminated acetoguanamines, guanamines, phenols, or mixtures thereof with formaldehyde in a solvent, in a ratio of from 1:1 to 1:6.

17. The process as claimed in claim 16, wherein the reaction is effected in an alkaline medium.

18. The process as claimed in claim 16, wherein at least one organic moiety R is at least one of a $C_1$-$C_{20}$-alkyl, a $C_5$-$C_{30}$-cycloalkyl, a $C_6$-$C_{24}$-aryl or a $C_7$-$C_{30}$-arylalkyl, a hydroxy-$C_2$-$C_{10}$-alkyl or a hydroxy-$C_2$-$C_4$-alkyl(oxa-$C_2$-$C_4$-alkyl)$_n$ moiety, where n is from 1 to 5, or an amino-$C_2$-$C_{12}$-alkyl moiety.

19. The process as claimed in claim 16, wherein the melamine-formaldehyde condensate is etherified under acidic catalysis with at least one of methanol, ethanol, propanol, isopropanol, butanol, cyclohexanol, phenol, benzyl alcohol, monoalkyl ethers of ethylene glycol or propylene glycol.

20. The process as claimed in claim 16, wherein at least one organic moiety R is at least one of methyl, ethyl, propyl, isopropyl, or benzyl.

* * * * *

UNITED STATES PATENT AND TRADEMARK OFFICE
CERTIFICATE OF CORRECTION

| | | |
|---|---|---|
| PATENT NO. | : 8,114,953 B2 | Page 1 of 1 |
| APPLICATION NO. | : 12/280246 | |
| DATED | : February 14, 2012 | |
| INVENTOR(S) | : Helmut Puchinger et al. | |

It is certified that error appears in the above-identified patent and that said Letters Patent is hereby corrected as shown below:

Column 10, Line 49, Claim 16, after "present" delete "only"

Signed and Sealed this
Eighth Day of May, 2012

David J. Kappos
*Director of the United States Patent and Trademark Office*